US012269196B2

(12) United States Patent
Lojek, III et al.

(10) Patent No.: US 12,269,196 B2
(45) Date of Patent: Apr. 8, 2025

(54) INTERNAL HYDROFORMING METHOD FOR MANUFACTURING HEAT PIPE WICKS (71) Applicant: Westinghouse Electric Company LLC, Cranberry Township, PA (US)

(72) Inventors: John Lojek, III, Latrobe, PA (US); Matthew M. Swartz, Claridge, PA (US); William A. Byers, Murrysville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 18/362,689

(22) Filed: Jul. 31, 2023

(65) Prior Publication Data
US 2024/0017448 A1 Jan. 18, 2024

Related U.S. Application Data (62) Division of application No. 16/853,270, filed on Apr. 20, 2020, now Pat. No. 11,780,122.

(51) Int. Cl.
*B29C 43/10* (2006.01)
*B29C 43/36* (2006.01)
*B29L 31/18* (2006.01)

(52) U.S. Cl.
CPC .......... *B29C 43/10* (2013.01); *B29C 43/3642* (2013.01); *B29C 2043/3602* (2013.01); *B29C 2043/3649* (2013.01); *B29L 2031/18* (2013.01)

(58) Field of Classification Search
CPC ..... B29C 57/08; B29C 70/446; B29C 70/342; B29C 70/32; B29C 33/485; B29C 33/50; B29C 33/505; B29C 33/76
See application file for complete search history.

(56) References Cited

U.S. PATENT DOCUMENTS 2,999,780 A    9/1961 Perrault
3,156,598 A    11/1964 Martin
(Continued)

FOREIGN PATENT DOCUMENTS

JP    S5596890 A    7/1980
JP    H9119789 A    5/1997
(Continued)

OTHER PUBLICATIONS

International Search Report and Written Opinion for International PCT Application No. PCT/US2021/028129, dated Jul. 27, 2021.
(Continued)

*Primary Examiner* — Matthew J Daniels
(74) *Attorney, Agent, or Firm* — K&L Gates LLP (57) ABSTRACT

A forming assembly configured to form a wick is disclosed. The forming assembly includes an expandable tube and a forming shell assembly. The expandable tube is hydraulically expandable to an expanded configuration. A wick mesh is configured to be wrapped about the expandable tube. The forming shell assembly includes a first forming shell comprising a first recess defined therein and a second forming shell comprising a second recess defined therein. The first recess and the second recess cooperate to define an outer diameter of the wick. The expandable tube and the wick mesh are positionable between the first recess and the second recess. The expandable tube and the forming shell assembly are configured to deform the wick mesh and form the wick based on the expandable tube hydraulically expanding towards the expanded configuration.

16 Claims, 9 Drawing Sheets

(56) References Cited

U.S. PATENT DOCUMENTS

| | | |
|---|---|---|
| 3,257,690 A | 6/1966 | Mandrel |
| 3,290,728 A | 12/1966 | Pratt |
| 3,561,079 A | 2/1971 | Anderson |
| 3,681,843 A | 8/1972 | Arcella et al. |
| 3,964,902 A | 6/1976 | Fletcher et al. |
| 4,049,762 A * | 9/1977 | Martino ............. B29C 57/08 264/506 |
| 4,186,793 A | 2/1980 | Usui |
| 4,413,845 A | 11/1983 | Lawrence |
| 4,876,049 A | 10/1989 | Aoyama et al. |
| 5,071,506 A | 12/1991 | Nelson et al. |
| 5,624,519 A | 4/1997 | Nelson et al. |
| 6,071,460 A | 6/2000 | Renaudin et al. |
| 7,674,418 B2 | 3/2010 | Matsumoto et al. |
| 2004/0092330 A1 | 5/2004 | Meyer et al. |
| 2006/0207749 A1 | 9/2006 | Hsu |
| 2007/0063378 A1 | 3/2007 | O'Donoghue |
| 2011/0120585 A1 | 5/2011 | Hur et al. |
| 2013/0043004 A1 | 2/2013 | Wang et al. |
| 2018/0290403 A1 | 10/2018 | Hasan et al. |

FOREIGN PATENT DOCUMENTS

| | | |
|---|---|---|
| SU | 1611678 A1 | 7/1988 |
| TW | 200932472 A | 8/2009 |
| WO | 2017135621 A2 | 8/2017 |

OTHER PUBLICATIONS

Search Report for corresponding Taiwan Application No. 110114213, dated Mar. 9, 2022.

\* cited by examiner

INTERNAL HYDROFORMING METHOD FOR MANUFACTURING HEAT PIPE WICKS

CROSS-REFERENCE TO RELATED APPLICATION

This application is a divisional application claiming priority under 35 U.S.C. § 120 to U.S. patent application Ser. No. 18/362,689, entitled INTERNAL HYDROFORMING METHOD FOR MANUFACTURING HEAT PIPE WICKS, filed Jul. 31, 2023, the entire disclosure of which is hereby incorporated by reference herein.

GOVERNMENT CONTRACT

This invention was made with government support under Contract DE-NE0008853 awarded by the Department of Energy. The government has certain rights in the invention.

BACKGROUND

This invention relates generally to heat pipes used in heat transfer systems, and more particularly, to wicks within the heat pipes that are configured to transfer the working fluid of the heat pipe from a condenser region of the heat pipe to an evaporator region.

Figure 1:
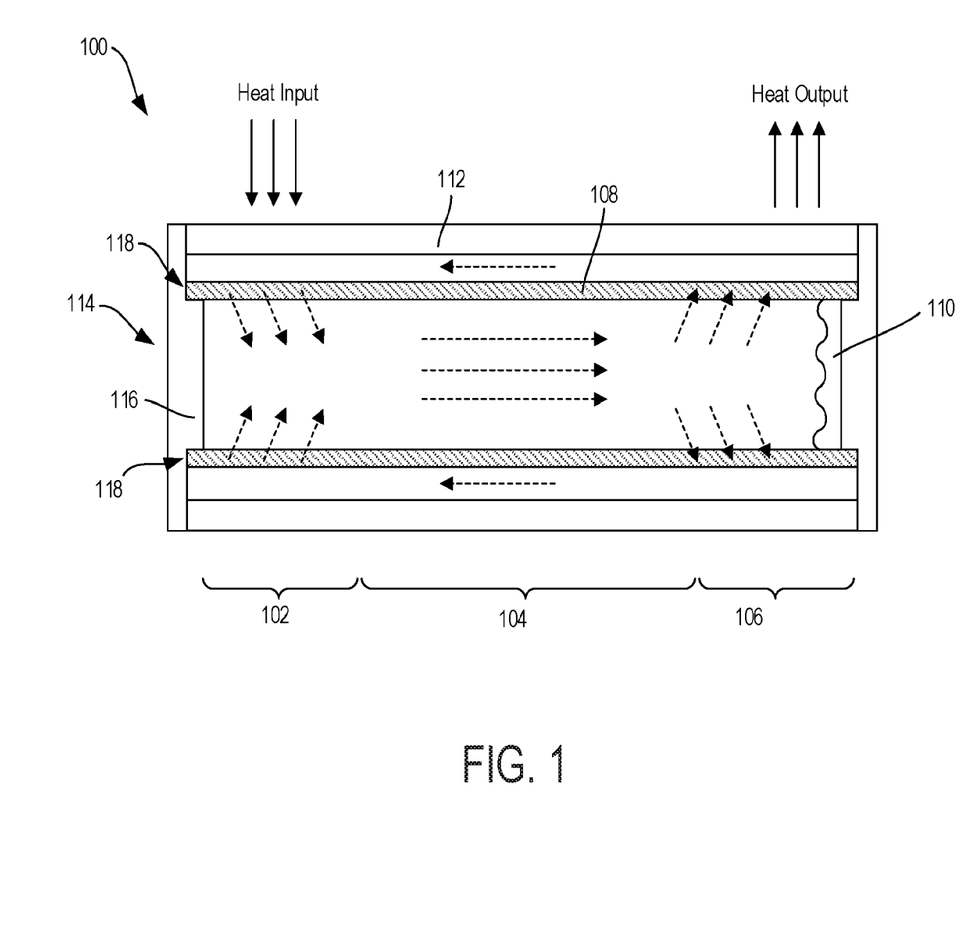
FIG. 1 illustrates working fluid moving through a heat pipe.

A heat pipe is a hermetically sealed, two-phase heat transfer component used to transfer heat from a primary side (evaporator section) to a secondary side (condenser section). FIG. 1, as an example, illustrates a heat pipe 100 comprising the aforementioned evaporator section 102 and condenser section 106, along with an adiabatic section 104 extending therebetween. The heat pipe 100 further includes a working fluid (such as water, liquid potassium, sodium, or alkali metal) and a wick 108. In operation, the working fluid is configured to absorb heat in the evaporator section 102 and vaporize. The saturated vapor, carrying latent heat of vaporization, flows towards the condenser section 106 through the adiabatic section 104. In the condenser section 106, the vapor condenses into a liquid pool 110 and gives off its latent heat. The condensed liquid is then returned to the evaporator section 102 through the wick 108 by capillary action. The aforementioned flow path of the working fluid is illustrated by segmented arrows in FIG. 1. The phase change processes and two-phase flow circulation continues as long as the temperature gradient between the evaporator and condenser sections is maintained. Due to the very high heat transfer coefficients for boiling and condensation, heat pipes are highly effective thermal conductors.

In nuclear systems, heat pipes are utilized by placing the evaporator section of the heat pipe within the reactor core containing nuclear fuel and the condenser section is placed near heat exchangers. The nuclear fuel vaporizes the working fluid and heat exchangers absorb the latent heat at the condenser section. Example heat pipes in nuclear applications are described in U.S. Pat. Nos. 5,684,848, 6,768,781, and U.S. Patent Application Publication No. 2016/0027536, all of which are incorporated by reference in their entirety.

Another example use for heat pipes in nuclear systems is with micro-reactors, which are nuclear reactors that generate less than 10 MWe and are capable of being deployed for remote applications. These micro-reactors can be packaged in relatively small containers, operate without active involvement of personnel, and operate without refueling/replacement for a longer period than conventional nuclear power plants. One such micro-reactor is the eVinci Micro Reactor system, designed by Westinghouse Electric Company. The eVinci system is a heat pipe cooled reactor power system that utilizes heat pipes to act as passive heat removal devices that efficiently move thermal energy out of the reactor core to heat exchangers.

The heat pipes used in the micro-reactors experience extreme operating temperatures (>850° C.) and requires an internal wick that is made from materials that can withstand these temperatures and are compatible with the working fluid. This wick can be constructed from a wire mesh that is rolled and diffusion bonded together into a tube-like structure. The wick tube allows for the working fluid within the heat pipe to pass through it radially (such as after the latent heat is given off and the working fluid is absorbed by the wick) and along its axis (transferring the working fluid back toward the evaporator section with capillary action) while remaining rigid.

Manufacturing a wick for insertion into a heat pipe requires a highly complex and detailed process. At a very high level, a wick is manufactured by rolling a sheet of woven wick mesh material into a desired shape, compressing materials (such as tubing) into the wick to forcefully deform the wick into the desired shape, diffusion bonding the mesh together in an oven at vacuum levels while maintaining the wick in a compressed state, and then removing materials used to hold the wick in the compressed state during diffusion bonding. An example of this method for wick forming method are described in U.S. Pat. No. 3,964,902, titled "METHOD OF FORMING A WICK FOR A HEAT PIPE", which is incorporated by reference herein.

As described above, the current method of forming a wick requires that materials used to hold the wick in the compressed state need to removed after the diffusion bonding process need to be removed. U.S. Pat. No. 3,964,902, as an example, describes how copper inner and outer mandrels are used to compress the wick and then, after diffusion bonding, the inner and outer mandrel need to be chemically removed through a chemical etching technique. Exposing the wick to this chemical etching process, however, introduces impurities into the wick and diminishes the wicks ability to perform its intended function. The chemical etching technique also results in an increased time and cost associated with producing wicks.

It is the goal of the present disclosure to provide an assembly and method for forming wicks at significantly lower cost and time than other publically documented methods, as well as eliminating the need to use chemicals to remove materials from the wick after it has been formed.

SUMMARY

In various embodiments, a forming assembly configured to form a wick is disclosed. The forming assembly includes an expandable tube and a forming shell assembly. The expandable tube is hydraulically expandable to an expanded configuration. A wick mesh is configured to be wrapped about the expandable tube. The forming shell assembly includes a first forming shell including a first recess defined therein and a second forming shell including a second recess defined therein. The first recess and the second recess cooperate to define an outer diameter of the wick. The expandable tube and the wick mesh are positionable between the first recess and the second recess. The expandable tube and the forming shell assembly are configured to deform the wick mesh and form the wick based on the expandable tube hydraulically expanding towards the expanded configuration.

In various embodiments, a method of forming a wick by a forming shell assembly including an inflatable tube is disclosed. The method includes positioning a wick mesh about the inflatable tube, positioning the inflatable tube and the wick mesh within a receiving area of the forming shell assembly, coupling a first end flange to a first side of the forming shell assembly, and coupling a second end flange to a second side of the forming shell assembly. The first end flange includes a hydraulic opening defined therein. The hydraulic opening is in fluid communication with the inflatable tube. The method further includes clamping the forming shell assembly with a clamp plate assembly and applying pressure, via a source of pressure, to the inflatable tube through the hydraulic opening to transition the inflatable tube toward an inflated configuration to press the wick mesh against an inner surface of the forming shell assembly.

In various embodiments, a forming assembly configured to form a wick is disclosed. The forming assembly includes a wick assembly including a porous support tube including pores defined therein and an inflatable tube configurable between a delated configuration and an inflated configuration. The inflatable tube is positioned about the porous support tube. A wick mesh is configured to be wrapped about the inflatable tube. The forming assembly further includes a forming shell assembly including a first forming shell including a first recess defined therein and a second forming shell including a second recess defined therein. The wick assembly is positionable between the first recess and the second recess. The forming shell assembly further includes a first end flange and a second end flange. The first end flange is couplable to the first forming shell and the second forming shell. The first end flange includes a first receiving area configured to receive a first o-ring, a first portion of the porous support tube, and a first portion of the inflatable tube therein and a hydraulic opening configured to fluidically couple a source of pressure to the inflatable tube. The second end flange is couplable to the first forming shell and the second forming shell. The second end flange includes a second receiving area configured to receive a second o-ring, a second portion of the porous support tube, and a second portion of the inflatable tube therein.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Applicant of the present application owns the following patent applications that were filed concurrently herewith and which are hereby incorporated by reference in their respective entireties herein:

U.S. Provisional Patent Application No. 63/012,725, entitled "INTERNAL HYDROFORMING METHOD FOR MANUFACTURING HEAT PIPE WICKS UTILIZING A HOLLOW MANDREL AND SHEATH", by inventors John Lojek III, et al.

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

Figure 2:
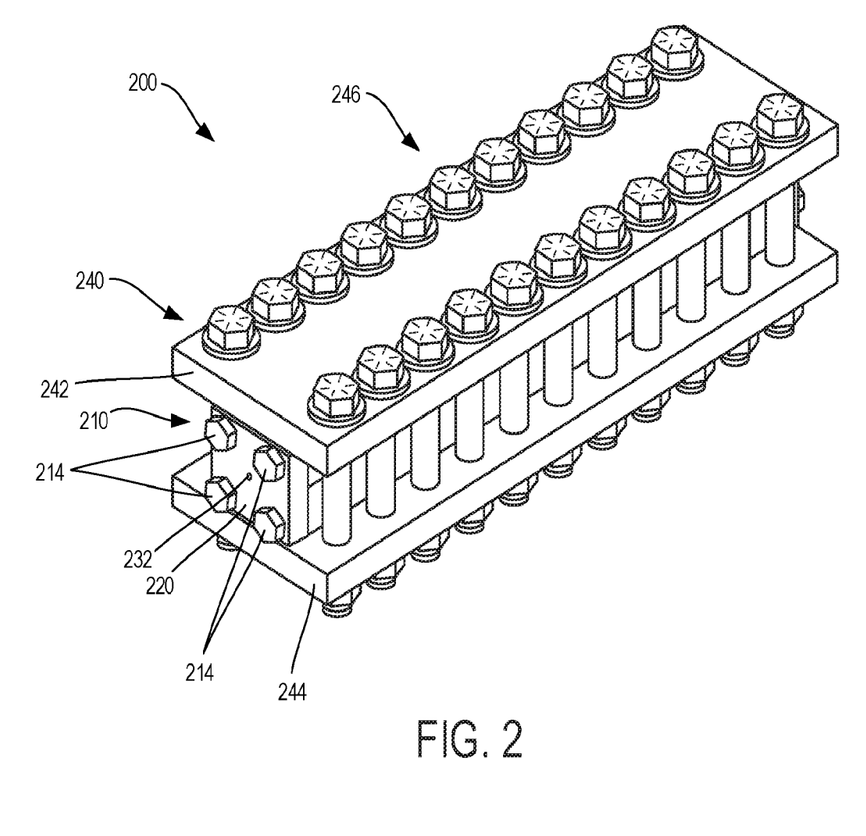
FIG. 2 illustrates a forming assembly, according to at least one aspect of the present disclosure.
Figure 3:
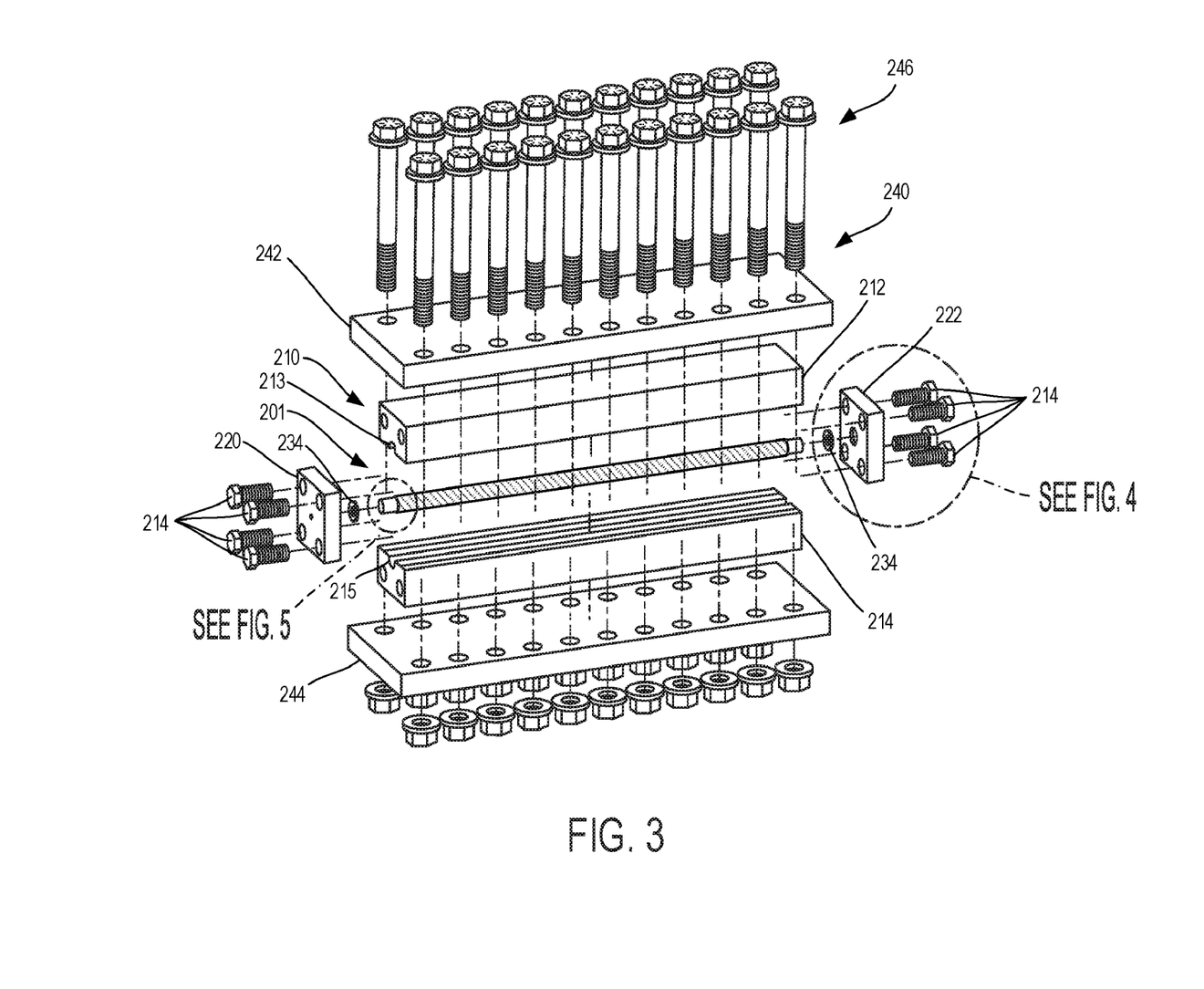
FIG. 3 illustrates an exploded view of the forming assembly of FIG. 2, according to at least one aspect of the present disclosure.
Figure 4:
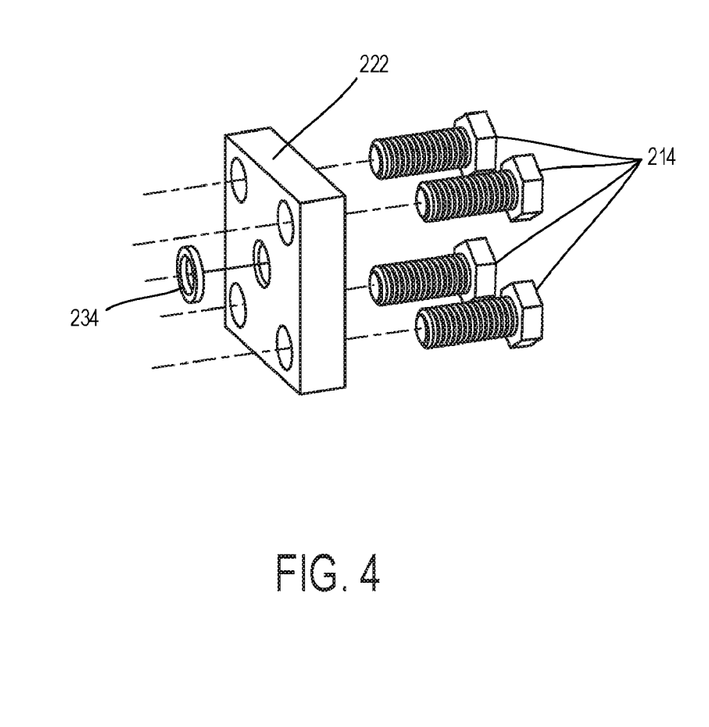
FIG. 4 illustrates a zoomed in view of an end flange, fasteners, and an o-ring of the forming assembly of FIG. 3, according to at least one aspect of the present disclosure.
Figure 5:
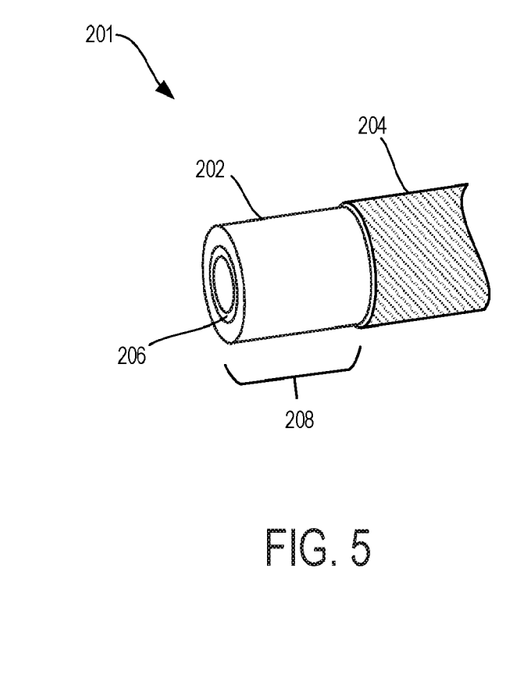
FIG. 5 illustrates a zoomed in view of an expandable tube, a support tube, and a wick mesh of the forming assembly of FIG. 3, according to at least one aspect of the present disclosure.
Figure 6:
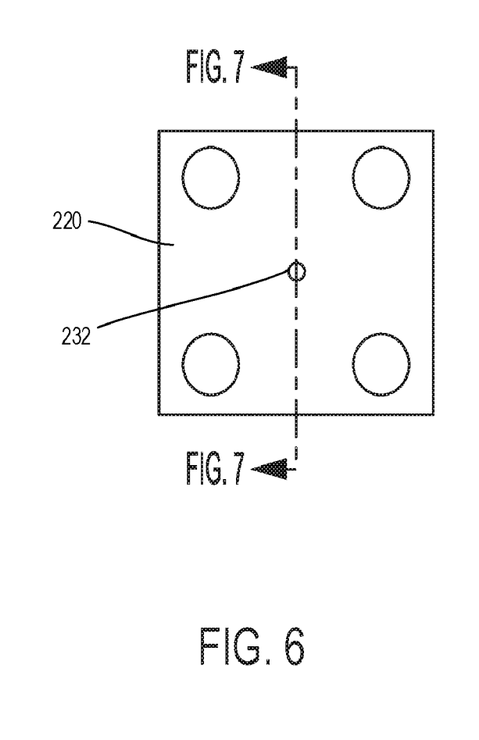
FIG. 6 illustrates a first end flange of the forming assembly of FIG. 2, according to at least one aspect of the present disclosure.
Figure 7:
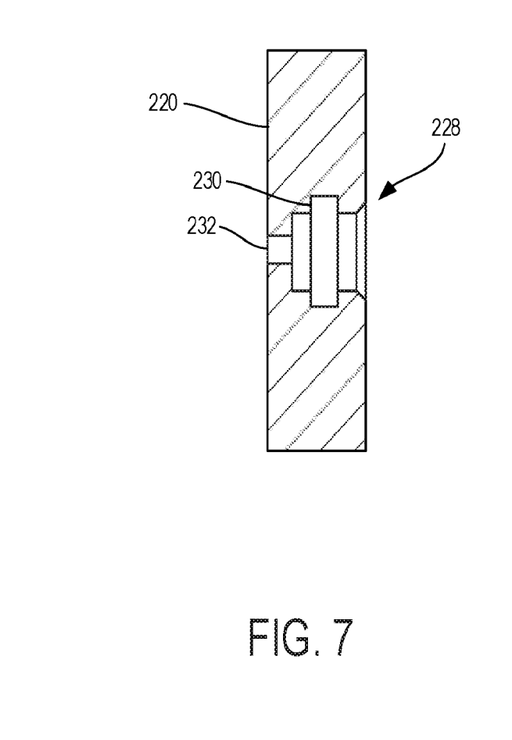
FIG. 7 illustrates a cross-sectional view of the first end flange of FIG. 6, according to at least one aspect of the present disclosure.

FIG. 2 illustrates a forming assembly 200 for forming a wick, according to at least one aspect of the present disclosure. FIG. 3 illustrates an exploded view of the forming assembly 200. Referring particularly to FIGS. 3 and 5, the forming assembly 200 includes a wick forming assembly 201. The wick forming assembly 201 can include an expandable, or inflatable, tube 202 that is transitionable between an unexpanded, or deflated, configuration and a hydraulically expanded, or inflated, configuration. A sheet, or a plurality of layered sheets, of wick mesh 204 are configured to be tightly rolled or wrapped about the expandable tube 202. The expandable tube 202 can be fabricated out of any suitable material, such as polyurethane, as an example. The expandable tube 202 material is selected such that when the wick mesh 204 is formed into a wick, as will be explained in more detail below, the expandable tube 202 will not substantially adhere, attach, or leave substantial trace material on the wick to a degree that compromises the wick's composition, structural integrity, and/or shape.

The wick forming assembly 201 can also include a support tube 206. The support tube 206 is configured to be positioned within the expandable tube 202 and provide initial structural support to the expandable tube 202 and the wick mesh sheets 204 rolled about the expandable tube 202. The support tube 206 includes a plurality of holes, apertures, or pores defined therein such that a pressurized, hydraulic medium, such as water, air, or any other suitable hydraulic medium, applied through the support tube 206 will impart a force onto the expandable tube 202 through the holes of the support tube 206 to transition the expandable tube 202 toward the expanded configuration. Stated another way, the pores of the support tube 206 fluidically couple a source of hydraulic pressure to the expandable tube 202. Accordingly, the support tube 206 improves the structural integrity of the expandable tube 202, which facilitates placement of the work mesh 204 around the expandable tube 202 without compromising its flexibility, which is necessary for its expansion function.

The examples provided in connection with FIGS. 2, 3 are designed to yield a tubular wick by utilizing the expandable tube 202 and the support tube 206. This, however, is not limiting. Other wick designs are contemplated by the present disclosure such as, for example, wicks with a cross-section in the form of pentagon, Hexagon, Heptagon, Octagon, or any suitable polygon. In such embodiments, geometrically suitable expandable enclosures and support enclosures can be utilized.

As shown in FIG. 5, the length of the sheet of wick mesh 204 is configured to be cut shorter than the length of the expandable tube 202 and support tube 206 such that an uncaptured zone 208 is defined between an end of the sheet of wick mesh 204 and an end of the expandable tube 202 and support tube 206. Other embodiments are envisioned where the wick mesh 204 is not cut short such that the length of the expandable tube 202, the support tube 206, and the wick mesh 204 are the same, or at least substantially the same.

Referring again to FIGS. 2 and 3, the forming assembly 200 can further can include a forming shell assembly 210. The forming shell assembly 210 includes a top, or first, forming shell 212 and a bottom, or second, forming shell 214. Each of the first and second forming shells 212, 214 can be fabricated out of any suitable solid material, such as stainless steel, as an example. In one embodiment, the forming shells 212, 214 can be fabricated out of the same material as the wick mesh 204 material. Each of the first and second forming shells 212, 214 include a cavity, or recess, 213, 215 defined therein that extends along the length thereof. The recesses 213, 215 of the forming shells 212, 214 are configured to be complementary such that, when the first and second forming shells 212, 214 are brought into abutting contact, the recesses 213, 215 cooperate to define a receiving area 218, seen in FIGS. 12 and 13, that is configured to receive the wick forming assembly 201 and the sheet(s) of wick mesh 204. The recesses 213, 215 are sized such that, when brought into abutting contact to define the receiving area 218, a gap g is defined between the wick mesh 204 and each of the recesses 213, 215.

The recesses 213, 215 of the first and second forming shells 212, 214 are configured to provide a solid surface and a boundary of maximum deformation to the sheet(s) of wick mesh 204. The recesses 213, 215 are configured to act on the sheet(s) of wick mesh 204 rolled about the expandable tube 202 as the expandable tube 202 hydraulically expands to the expanded configuration. The recesses 213, 215 are configured to define an outer diameter and final shape of the wick. In one embodiment, the recesses 213, 215 comprise half-circle cross-sectional shapes, shown in FIG. 3, as an example, with a radius of curvature such that, when the first and second forming shells 212, 214 are brought into abutting contact, the half-circle shaped recesses 213, 215 form a circular shape throughout the length of the forming shell assembly 210. Other embodiments are envisioned where the recesses 213, 215 of each forming shell 212, 214 comprise other complementary shapes, such that, when the first and second forming shells are brought into abutting contact, the recess 213, 215 cooperate to form other shapes, such as an oval, a square, or any other symmetrical shape that is desired of the wick. Other examples are envisioned where the recesses 213, 215 of each forming shell 212, 214 are dissimilar relative to the other such that, when the first and second forming shells 212, 214 are brought into abutting contact, non-symmetrically shaped wicks can be formed. The recesses 213, 215 can be shaped such that any desired wick shape is possible.

Referring again to FIG. 3, the forming shell assembly 210 can further include a first end flange 220 and a second end flange 222. The first end flange 220 and the second end flange 222 are configured to be fastened to the ends of the first forming shell 212 and second forming shell 214 by a plurality of fasteners 224. In one embodiment, the fasteners 224 can comprise bolts configured to be threadably received in threaded apertures defined in the first and second forming shells 212, 214. While fasteners 224 are shown and described, other suitable methods are envisioned for coupling the end flanges 220, 222 to the first and second forming shells 212, 214, such as with a latch mechanism, an adhesive, or clamps, as examples.

Figure 8:
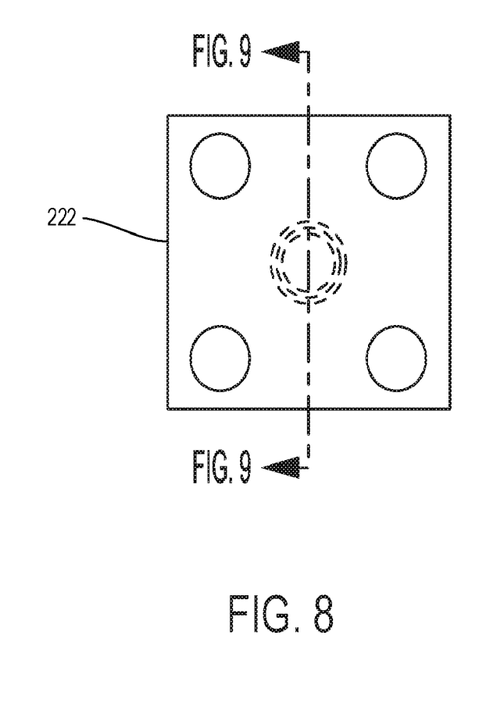
FIG. 8 illustrates a second end flange of the forming assembly of FIG. 2, according to at least one aspect of the present disclosure.
Figure 9:
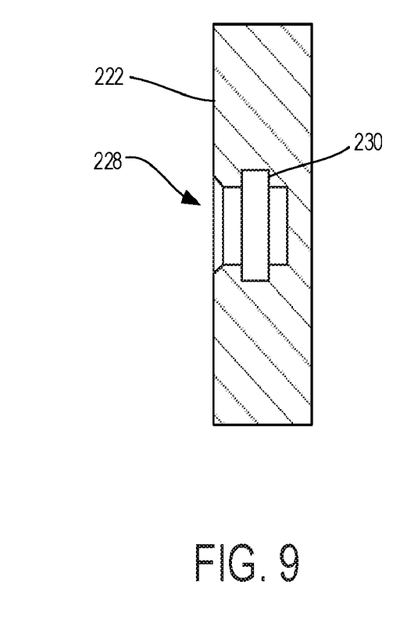
FIG. 9 illustrates a cross-sectional view of the second end flange of FIG. 8, according to at least one aspect of the present disclosure.
Figure 10:
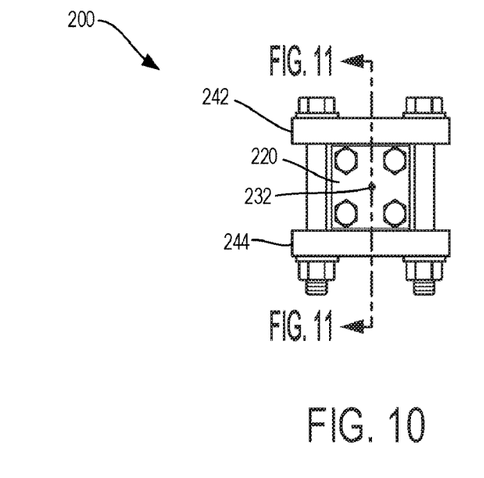
FIG. 10 illustrates a front view of the forming assembly of FIG. 2, according to at least one aspect of the present disclosure.
Figure 11:
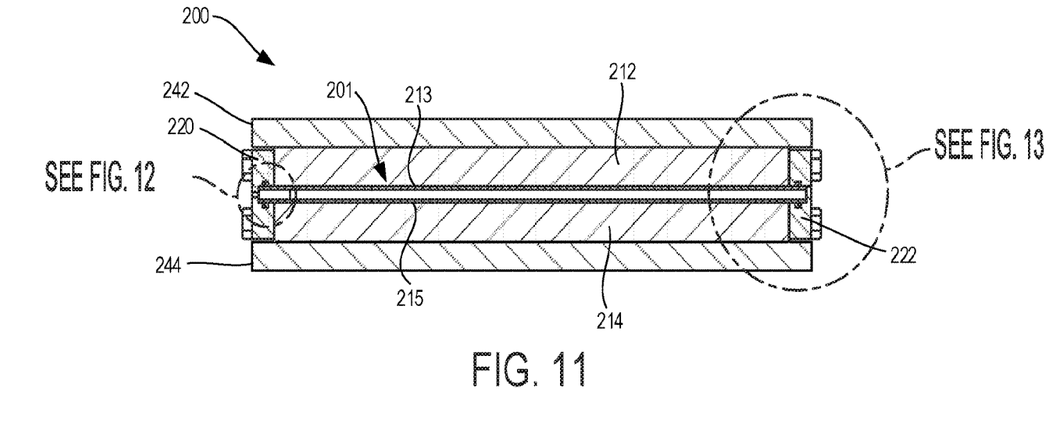
FIG. 11 illustrates a cross-sectional view of the forming assembly of FIG. 10, according to at least one aspect of the present disclosure.
Figure 12:
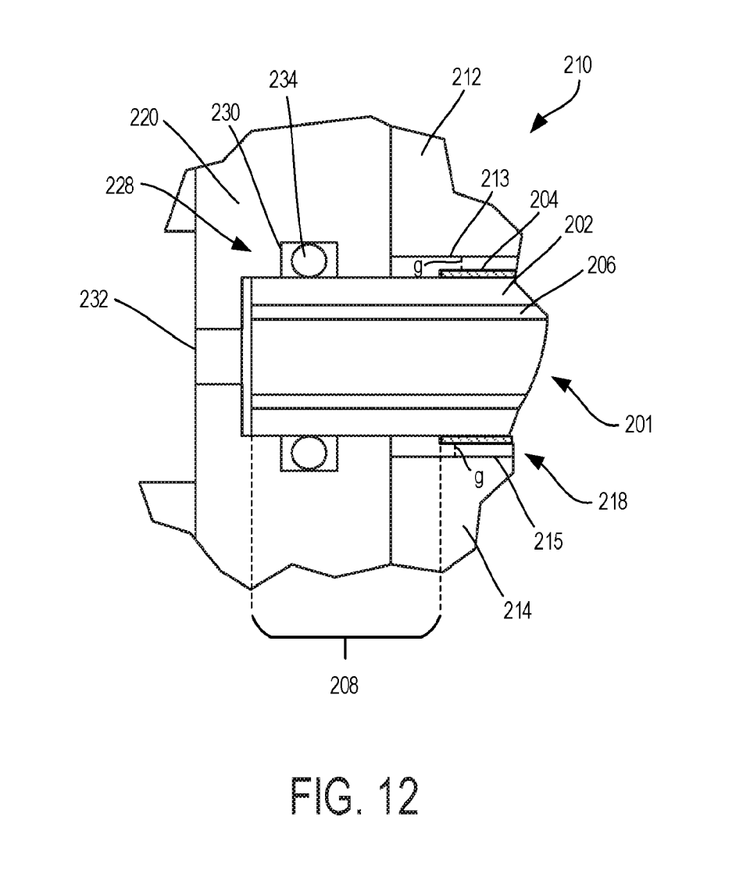
FIG. 12 illustrates a detailed view of the expandable tube and support tube inserted within a receiving area of the first flange, according to at least one aspect of the present disclosure.
Figure 13:
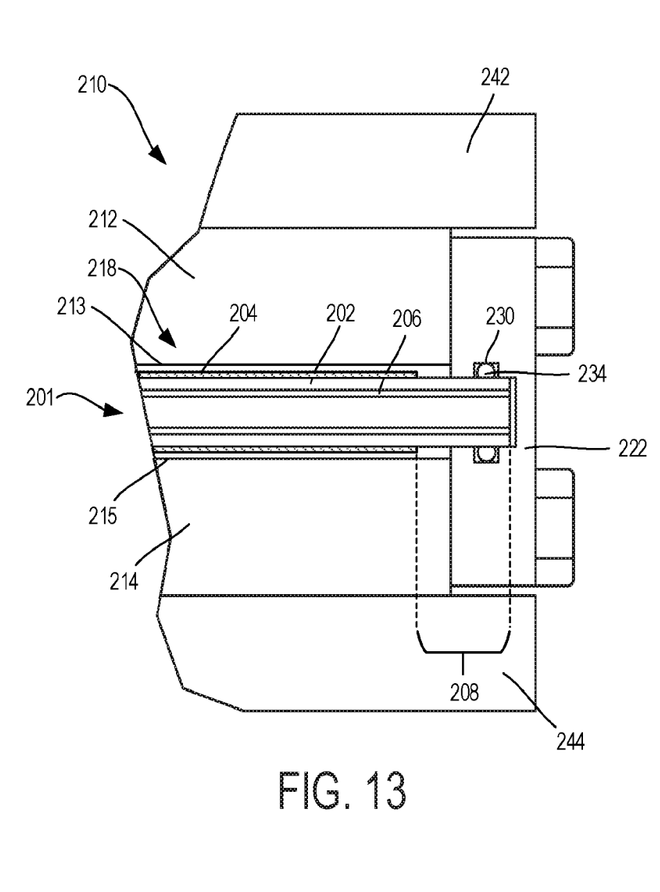
FIG. 13 illustrates a detailed view of the expandable tube and support tube inserted within a receiving area of the second flange, according to at least one aspect of the present disclosure.

As shown in FIGS. 8 and 12, the first end flange 220 includes a wick assembly receiving area 228, a groove 230 extending about the wick assembly receiving area 228, and a hydraulic opening 232. As discussed above, the length of the sheet of wick mesh 204 is configured to be cut shorter than the length of the expandable tube 202 and support tube 206 such that an uncaptured zone 208 is defined between an end of the sheet of wick mesh 204 and an end of the expandable tube 202 and support tube 206. As shown in FIG. 12, a portion of the uncaptured zone 208 is configured to be received by the wick assembly receiving area 228 of the first end flange 220. In addition, an o-ring 234 is configured to be positioned in the groove 230 such that the o-ring 234 is positioned about the portion of the uncaptured zone 208. The combination of the uncaptured zone 208 and the o-ring 234 within the wick assembly receiving area 228 creates a seal within the forming shell assembly 210. The second end flange 222, as shown in FIGS. 9 and 13, is substantially similar to the first end flange 220, with the exception being that the second end flange 222 does not include a hydraulic opening 232. Other embodiments are envisioned wherein both the first and second end flange 220, 222 include a hydraulic opening 232.

The hydraulic opening 232 of the first end flange 220 is configured to interact with a source of hydraulic pressure, such as a water source, an air source, or any other suitable source of hydraulic pressure. The source of hydraulic pressure is configured to apply pressure to the expandable tube 202 by way of the hydraulic opening 232 and the pores defined in the support tube 206, causing the expandable tube 202 to transition towards the expanded configuration.

As mentioned above, a portion of the uncaptured zone 208 of the wick forming assembly 201 is configured to be insert through the wick assembly receiving areas 228 and o-rings 234 of the first and second end flanges 220, 222, creating a seal. The seal allows internal pressurization of the expandable tube 202 via the source of hydraulic pressure. The seals also prevent fluid from escaping or leaking from the forming shell assembly 210, as well as prevents the hydraulic fluid from coming into contact with the wick mesh 204 about the expandable tube 202. In addition, as discussed above, the length of the sheet of wick mesh 204 is configured to be cut shorter than the length of the expandable tube 202 and support tube 206, preventing the wick mesh 204 from expanding into the non-uniform surfaces of the first and second end flanges 220, 222, such as the wick assembly receiving areas 228 or the grooves 230.

Referring again to FIGS. 2 and 3, the forming assembly 200 can comprise a clamp plate assembly 240. The clamp plate assembly 240 can include a first clamp plate 242 and a second clamp plate 244. The first clamp plate 242 is configured to abut the first forming shell 212, the first end flange 220, and the second end flange 222. The second clamp plate 244 is configured to abut the second forming shell 214, the first end flange 220, and the second end flange 222. Other embodiments are envisioned where the clamp plates 242, 244 only contact the forming shells 212, 214 and not contact the end flanges 220, 222. A plurality of fasteners 246 can be configured to fasten the first clamp plate 242 to the second clamp plate 242. The clamp plate assembly 240 can be modified in dimension to accommodate any number of forming shell assemblies.

The clamp plate assembly 240 is configured to apply a preloaded pressure to the forming shell assembly 210 such that, when the source of pressure hydraulically expands the expandable tube 202 and the wick mesh 204 into abutting contact with the recesses 213, 215 of the forming shells 212, 214, the forming shells 212, 214 remain compressed with no separation therebetween. In one embodiment, the plurality of fasteners 246 can comprises bolts, nuts, and washers, as shown in FIG. 3. Other means for preventing the first forming shell 212 and the second forming shell 214 from separating are contemplated by the present disclosure in lieu of the clamp plate assembly 240, such as a latch assembly, a plurality of clamps, or any other suitable means for preventing the first forming shell and the second forming shell from separating during pressurization of the expandable tube 202.

The clamp plate assembly 240 is configured to provide additional structural rigidity to the forming shell assembly 210 to minimize deformation throughout pressurization of the expandable tube 202. The plurality of fasteners 246 along the length of the clamp plate assembly 240 can be configured to center the forming shell assembly 210 within the clamp plate assembly 240. In one embodiment, the clamp plate assembly 240 could include a groove which acts as a centering mechanism for the forming shell assembly 210. The first and second clamp plate 242, 244 thickness and overall dimensions can be modified such as to permit higher internal forming pressures experienced by the expandable tube 202.

In operation, a sheet, or a plurality of layered sheets, of wick mesh 204 is configured to be tightly rolled or wrapped about the wick forming assembly 201, which can be comprised of the expandable tube 202 and the support tube 206. The wick mesh layer 204 is cut intentionally short such that uncaptured zones 208 are defined on both ends of the wick forming assembly 201. The wick forming assembly 201 and the rolled wick mesh 204 are then placed within the receiving area 218 of the forming shell assembly 210. Stated another way, the wick forming assembly 201 and the rolled wick mesh 204 is are placed in the first forming shell recess 213 of the first forming shell 212, then the second forming shell 214 is placed on top of the first forming shell 212 such that the wick forming assembly 201 and the rolled wick mesh 204 are captured by the second forming shell recess 215. The wick forming assembly 201 is axially positioned within the forming shell assembly 210 such that a portion of the uncaptured zones 208 extend out of each side of the shell forming assembly 210, as shown in FIGS. 12 and 13.

Other embodiments are envisioned where the sheet, or the plurality of layered sheets, of wick mesh 204 are placed within the receiving area 218 of the forming shell assembly 210, then the expandable tube 202 and support tube 206 are placed within the receiving area 218, and then the wick mesh 204 is wrapped about the expandable tube and support tube 206. Other embodiments are also envisioned where the wick mesh 204 is not cut intentionally short to define the uncaptured zones 208 such that, after the wick is formed by way of the process described below, the non-uniform ends of the wick are removed from the uniform regions of the wick.

An o-ring 234 is then be placed within the groove 230 of each of the first end flange 220 and the second end flange 222, as shown in FIGS. 12 and 13, an example. The first end flange 220 and the second end flange 222 are then each configured to receive a uncaptured zone 208 of the wick forming assembly 201 in their respective wick assembly receiving areas 228. The uncaptured zones 208 are inserted through the wick assembly receiving areas 228 and through the o-ring 234 of their respective end flange 220, 222, creating a seal within each end flange 220, 222, as described above. The first and second end flanges 220, 222 are then coupled to ends of the forming shell assembly 210 with the fasteners 224.

Next, the clamp plate assembly 240 can be positioned about the forming shell assembly 210, as shown in FIG. 2. The fasteners 246 are utilized to fasten the first clamp plate 242 to the second clamp plate 244, providing a preloaded pressure to the forming shell assembly 210.

After the clamp plate assembly 240 is positioned about the forming shell assembly 210, a source of pressure, such as a hydraulic pressure source, can apply pressure to the inside of the expandable tube 202 by way of the hydraulic opening 232 in the first flange 220 and the pores defined in the support tube 206. The expandable tube 202 hydraulically expands towards the expanded configuration and pushes the wick mesh 204 outward toward the recesses 213, 215 of the first and second forming shell 212, 214. As pushed outward, the wick mesh 204 unravels and becomes tightly wound until contact is made with the recesses 213, 215. Additional pressure can then be applied such that local plastic deformation occurs at contact regions of the wick mesh 204, creating a mechanical interlocking between the wick mesh layers. After the maximum forming pressure is applied and the layers of wick mesh form a formed, annular wick (up to 30 ksi, as an example), the expandable tube 202 is depressurized. The final outside diameter of the wick is determined by the recesses 213, 215 of the first and second forming shells 212, 214. The final thickness of the wick is determined by the thickness and initial, unrolled length of wick mesh.

As the expandable tube 202 is depressurized, the expandable tube 202 transitions towards the unexpanded configuration. As a result of the expandable tube 202 being fabricated from a material such as polyurethane, the expandable tube 202 separates away from the wick as it transitions towards the unexpanded configuration, allowing for manual removal of the expandable tube 202 from the wick without the need for chemical intervention, such as with chemical etching or chemically dissolving, as examples. The unique and novel forming assembly 200 is unlike other forming methods, which use drawn copper and chemical etching, such as is described in U.S. Pat. No. 3,964,902, incorporated by reference hereinabove. As discussed above in regard to the other forming methods, the copper becomes mechanically deformed into the mesh material such that manual removal is not possible without chemically removing the copper and damaging the rolled wick mesh.

The forming assembly 200 is designed with features that allow for easy and convenient assembly/disassembly. To disassemble the forming assembly after the wick has been formed and the forming assembly 200 had been depressurized, the fasteners 246 of the clamp plate assembly 240 are loosed or removed, allowing the forming shell assembly 210 to be pushed out from between the clamp plates 242, 244. The first and second end flanges 220, 222 are then removed by removing the associated fasteners 214. The o-ring 234 design allows for the flanges 220, 222 to slip off of the uncaptured zone 208 of the expandable tube 202 end and the support tube 206 end. As discussed above, the wick mesh 204 remains deformed after the forming process, allowing for the expandable tube 202 to transition towards the unexpanded configuration and separate away from the wick. With a space between the expandable tube 202 and wick, the expandable tube 202 and the support tube 206 can be easily removed. The top and bottom forming shells 212, 214 can then be separated and the wick can be removed.

The forming assembly and associated steps described above produce a wick which, after diffusion bonded, has been tested and proven to contain the proper dimensions (outside diameter, thickness), tolerances (approximately ±0.001 inch diameter), pore size and strength required to be utilized in a heat pipe. The forming assembly and associated steps has also been proven to be highly repeatable through multiple trials.

In one embodiment, the forming assembly 200 can be configured to produce one foot long wick at a specified diameter and thickness (based on predefined dimensions of the recesses 213, 215 and the selected number of layers of wick 214). In another embodiment, the forming assembly 200 can be configured to produce wicks up to approximately five feet in length with the same wick diameter and thickness dimensions. The forming assembly 200 design may be used to produce a continuous assembly to produce different lengths (as detailed herein) or be slightly modified to be assembled in sections. The length, diameter, and thickness of any formed wick is possible utilizing the above-described forming assembly and by modifying the dimensions of the recesses 213, 215, the length of the forming shell assembly 210, and the number of layers of wick mesh 204.

Since the final wick outside diameter is determined by the forming shell recesses, the dimension and shape of the recesses can be modified to produce a formed wick of varying dimensions and shapes, as discussed above.

Figure 14:
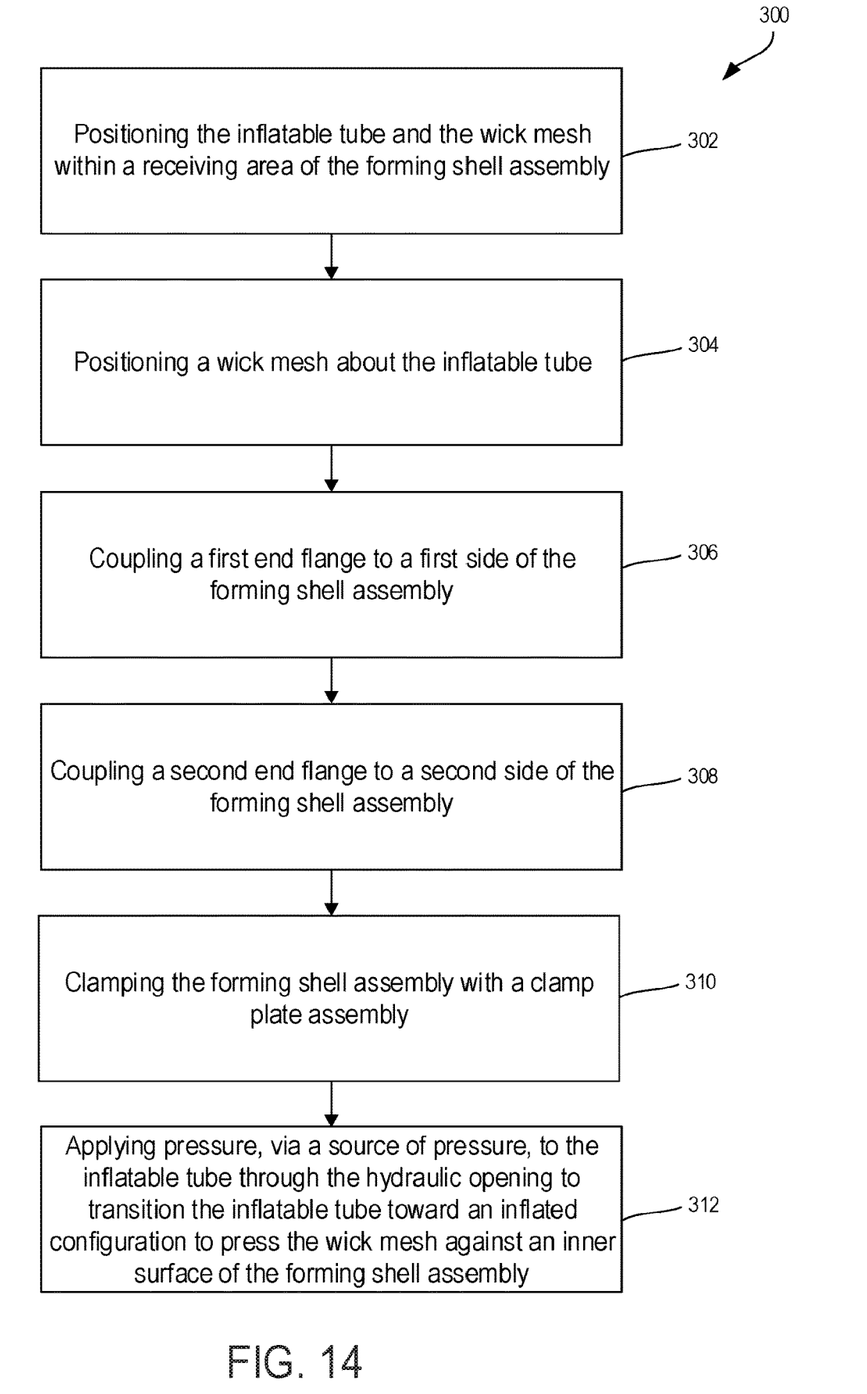
FIG. 14 illustrates a method of forming a wick by a forming shell assembly including an expandable tube, according to at least one aspect of the present disclosure.

Referring now to FIG. 14, a method 300 of forming a wick by the forming shell assembly 200 including an inflatable, or hydraulically expandable, tube is illustrated, in accordance with at least one aspect of the present disclosure. The method 300 includes positioning 302 a wick mesh about the inflatable tube, positioning 304 the inflatable tube and the wick mesh within a receiving area of the forming shell assembly, coupling 306 a first flange to a first side of the forming shell assembly, coupling 308 a second flange to a second side of the forming shell assembly, clamping 310 the forming shell assembly with a clamp plate assembly, and applying pressure 312, via a source of pressure, to the inflatable tube through the hydraulic opening to transition the expandable tube toward an inflated configuration to press the wick mesh against an inner surface of the forming shell assembly. The method 300 can optionally include transitioning the inflatable tube towards a deflated configuration and removing the wick from the inflatable tube. The method 300 can optionally include removing the wick from the inflatable tube comprises removing the wick from the inflatable tube absent chemical intervention. The method 300 can optionally includes positioning the inflatable tube about a porous support tube. The method can optionally include positioning a first o-ring, a first portion of the porous support tube, and a first portion of the expandable tube uncaptured by the wick mesh in a first receiving area defined in the first flange and positioning a second o-ring, a second portion of the porous support tube, and a second portion of the expandable tube uncaptured by the wick mesh in a second receiving area defined in the second flange.

Various aspects of the subject matter described herein are set out in the following examples.

Example 1—A forming assembly configured to form a wick, the forming assembly comprising an expandable tube and a forming shell assembly. The expandable tube is hydraulically expandable to an expanded configuration. A wick mesh is configured to be wrapped about the expandable tube. The forming shell assembly comprises a first forming shell comprising a first recess defined therein and a second forming shell comprising a second recess defined therein. The first recess and the second recess cooperate to define an outer diameter of the formed wick. The expandable tube and the wick mesh are positionable between the first recess and the second recess. The expandable tube and the forming shell assembly are configured to deform the wick mesh and form the wick based on the expandable tube hydraulically expanding towards the expanded configuration.

Example 2—The forming assembly of Example 1, wherein the wick is configured to separate from expandable tube based on the expandable tube transitioning toward an unexpanded configuration.

Example 3—The forming assembly of Example 2, wherein the wick is configured to separate from expandable tube absent chemical intervention.

Example 4—The forming assembly of any one of Examples 1-3, wherein the expandable tube comprises polyurethane.

Example 5—The forming assembly of any one of Examples 1-4, further comprising a clamp plate assembly configured to clamp the first forming shell to the second forming shell. The clamp plate assembly comprises a first clamp plate configured to abut the first forming shell, a second clamp plate configured to abut the second forming shell, and a fastener configured to fasten the first clamp plate to the second clamp plate.

Example 6—The forming assembly of any one of Examples 1-5, further comprising a support tube positionable within the expandable tube. The support tube comprises pores defined therein. The pores are configured to fluidically couple a source of pressure to the expandable tube.

Example 7—The forming assembly of any one of Examples 1-6, further comprising an end flange configured to couple the first forming shell to the second forming shell. The end flange comprises a hydraulic opening defined therein. The expandable tube is configurable to hydraulically expand towards the expanded configuration based on pressure applied through the hydraulic opening by a source of pressure.

Example 8—The forming assembly of Example 7, wherein the end flange comprises a receiving area configured to receive an o-ring and a portion of the expandable tube uncaptured by the wick mesh therein.

Example 9—A method of forming a wick by a forming shell assembly including an inflatable tube, the method comprising positioning a wick mesh about the inflatable tube, positioning the inflatable tube and the wick mesh within a receiving area of the forming shell assembly, coupling a first end flange to a first side of the forming shell assembly, and coupling a second end flange to a second side of the forming shell assembly. The first end flange comprises a hydraulic opening defined therein. The hydraulic opening is in fluid communication with the expandable tube. The method further comprises clamping the forming shell assembly with a clamp plate assembly and applying pressure, via a source of pressure, to the inflatable tube through the hydraulic opening to transition the expandable tube toward an inflated configuration to press the wick mesh against an inner surface of the forming shell assembly.

Example 10—The method of Example 9, wherein applying pressure to the inflatable tube comprises applying pressure to the inflatable tube such that the inflatable tube plastically deforms the wick mesh and forms the wick.

Example 11—The method of Example 10, further comprising transitioning the inflatable tube towards a deflated configuration and removing the wick from the inflatable tube.

Example 12—The method of Example 11, wherein removing the wick from the inflatable tube comprises removing the wick from the inflatable tube absent chemical intervention.

Example 13—The method of any one of Examples 9-12, further comprising positioning the inflatable tube about a porous support tube. Pores defined in the porous support tube are configured to fluidically couple the source of pressure to the inflatable tube.

Example 14—The method of Example 13, further comprising positioning a first o-ring, a first portion of the porous support tube, and a first portion of the expandable tube uncaptured by the wick mesh in a first receiving area defined in the first end flange and positioning a second o-ring, a second portion of the porous support tube, and a second portion of the expandable tube uncaptured by the wick mesh in a second receiving area defined in the second end flange.

Example 15—A forming assembly configured to form a wick, the forming assembly comprising a wick assembly comprising a porous support tube comprising pores defined therein and an inflatable tube configurable between a delated configuration and an inflated configuration. The inflatable tube is positioned about the porous support tube. A wick mesh is configured to be wrapped about the inflatable tube. The forming assembly further comprises a forming shell assembly comprises a first forming shell comprising a first recess defined therein and a second forming shell comprising a second recess defined therein. The wick assembly is positionable between the first recess and the second recess. The forming shell assembly further comprises a first end flange and a second end flange. The first end flange is couplable to the first forming shell and the second forming shell. The first end flange comprises a first receiving area configured to receive a first o-ring, a first portion of the porous support tube, and a first portion of the inflatable tube therein and a hydraulic opening configured to fluidically couple a source of pressure to the inflatable tube. The second end flange is couplable to the first forming shell and the second forming shell. The second end flange comprises a second receiving area configured to receive a second o-ring, a second portion of the porous support tube, and a second portion of the inflatable tube therein.

Example 16—The forming assembly of Example 15, further comprising means for preventing the first forming shell and the second forming shell from separating as the inflatable tube is inflated toward the inflated configuration.

Example 17—The forming assembly of Examples 15 or 16, wherein the inflatable tube comprises polyurethane.

Example 18—The forming assembly of any one of Examples 15-17, wherein the first recess and the second recess are configured to define an outer diameter of the wick.

Example 19—The forming assembly of any one of Examples 15-18, wherein the inflatable tube is configured to deform the wick mesh and form the wick based on the inflatable tube transitioning towards the inflated configuration.

Example 20—The forming assembly of Example 19, wherein the wick is configured to separate from inflatable tube absent chemical intervention.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method of forming a wick by a forming shell assembly including a first shell defining a first recess, a second shell defining a second recess, and an inflatable tube, wherein the first recess and the second recess are configured to define an inner diameter of the forming shell assembly, the method comprising:
positioning a wick mesh about the inflatable tube;
positioning the inflatable tube and the wick mesh within the inner diameter of the forming shell assembly;
coupling a first end flange to a first side of the forming shell assembly;
coupling a second end flange to a second side of the forming shell assembly, wherein the first end flange comprises a hydraulic opening defined therein, and wherein the hydraulic opening is in fluid communication with the inflatable tube;

clamping the first shell and the second shell together with a clamp plate assembly;

applying pressure, via a source of pressure, to the inflatable tube through the hydraulic opening to transition the inflatable tube toward an inflated configuration to press the wick mesh against the first recess and the second recess such that the wick mesh is plastically deformed to form the wick; and removing the formed wick from the forming shell assembly by separating the first shell and the second shell from each other;

the method further comprising:
  positioning the inflatable tube about a porous support tube, wherein pores defined in the porous support tube are configured to fluidically couple the source of pressure to the inflatable tube;
  positioning a first o-ring, a first portion of the porous support tube, and a first portion of the inflatable tube uncaptured by the wick mesh in a first receiving area defined in the first end flange; and
  positioning a second o-ring, a second portion of the porous support tube, and a second portion of the inflatable tube uncaptured by the wick mesh in a second receiving area defined in the second end flange.

2. The method of claim 1, further comprising:
transitioning the inflatable tube towards a deflated configuration prior to removing the formed wick from the forming shell assembly.

3. The method of claim 1, wherein the first recess and the second recess are configured to define an outer diameter of the formed wick, based on the wick mesh engaging the first recess and the second recess, and wherein the outer diameter of the formed wick is equal to the inner diameter of the forming shell assembly.

4. A method of forming a wick, comprising:
positioning a wick mesh about an inflatable tube;
positioning the inflatable tube and the wick mesh at least partially within a first recess defined in a first forming shell;
positioning a second forming shell onto the first forming shell such that the inflatable tube and the wick mesh are received at least partially in a second recess defined in the second forming shell;
coupling an end flange to the first forming shell and the second forming shell, wherein the end flange defines a hydraulic opening;
pressurizing the inflatable tube via the hydraulic opening to press the wick mesh against the first recess and the second recess to form the wick; and
removing the formed wick from the first recess and the second recess by separating the first forming shell and the second forming shell from each other;
the method further comprising:
  positioning the inflatable tube about a porous support tube, wherein pores defined in the porous support tube are configured to fluidically couple the source of pressure to the inflatable tube;
  positioning a first o-ring, a first portion of the porous support tube, and a first portion of the inflatable tube uncaptured by the wick mesh in a first receiving area defined in the first end flange; and
  positioning a second o-ring, a second portion of the porous support tube, and a second portion of the inflatable tube uncaptured by the wick mesh in a second receiving area defined in the second end flange.

5. The method of claim 4, wherein the end flange comprises a first end flange, and wherein the method further comprises coupling a second end flange to the first forming shell and the second forming shell.

6. The method of claim 4, further comprising:
abutting a first clamp plate against the first forming shell;
abutting a second clamp plate against the second forming shell; and
fastening the first clamp plate to the second clamp plate to clamp the first forming shell and the second forming shell together.

7. The method of claim 4, further comprising:
depressurizing the inflatable tube prior to removing the formed wick from the first recess and the second recess.

8. The method of claim 4, further comprising positioning a support tube within the inflatable tube.

9. The method of claim 8, wherein pressurizing the inflatable tube comprises pressurizing the inflatable tube via pores defined in the support tube.

10. The method of claim 4, wherein the first recess and the second recess are configured to define an outer diameter of the formed wick, based on the wick mesh engaging the first recess and the second recess, and wherein the outer diameter of the formed wick is equal to an inner diameter defined by the first recess and the second recess.

11. A method of forming a wick, comprising:
positioning a metallic wire mesh about an expandable tube;
positioning the expandable tube and the metallic wire mesh at least partially within a first recess defined in a first forming shell;
positioning a second forming shell such that the expandable tube and the metallic wire mesh are at least partially received in a second recess defined in the second forming shell;
coupling the first forming shell to the second forming shell;
pressurizing the expandable tube to press the metallic wire mesh against the first recess and the second recess to form the wick;
depressurizing the expandable tube; and
decoupling the first forming shell from the second forming shell to remove the formed wick;
the method further comprising:
  positioning an inflatable tube about a porous support tube, wherein pores defined in the porous support tube are configured to fluidically couple a source of pressure to the inflatable tube;
  positioning a first o-ring, a first portion of the porous support tube, and a first portion of the inflatable tube uncaptured by the wick mesh in a first receiving area defined in a first end flange; and
  positioning a second o-ring, a second portion of the porous support tube, and a second portion of the inflatable tube uncaptured by the wick mesh in a second receiving area defined in a second end flange.

12. The method of claim 11, wherein coupling the first forming shell to the second forming shell comprises coupling an end flange to the first forming shell and the second forming shell.

13. The method of claim 11, wherein coupling the first forming shell to the second forming shell comprises:
abutting a first clamp plate against the first forming shell;
abutting a second clamp plate against the second forming shell; and
fastening the first clamp plate to the second clamp plate.

14. The method of claim 11, further comprising positioning a support tube within the expandable tube.

15. The method of claim 14, wherein pressurizing the expandable tube comprises pressurizing the expandable tube via pores defined in the support tube.

16. The method of claim 11, wherein the first recess and the second recess are configured to define an outer diameter of the formed wick, based on the metallic wire mesh engaging the first recess and the second recess, and wherein the outer diameter of the formed wick is equal to an inner diameter defined by the first recess and the second recess.

* * * * *